United States Patent

Howard et al.

[11] Patent Number: 6,144,198
[45] Date of Patent: Nov. 7, 2000

[54] SYSTEM AND METHOD FOR DETERMINING RATE OF ROTATION USING BRUSHLESS DC MOTOR

[75] Inventors: David E. Howard, Hazel Green; Dennis A. Smith, Athens, both of Ala.

[73] Assignee: The United States of America as represented by the Administrator of the National Aeronautics and Space Administration, Washington, D.C.

[21] Appl. No.: 09/128,634

[22] Filed: Jul. 27, 1998

[51] Int. Cl.[7] .............................. G01P 3/46; H02K 11/00

[52] U.S. Cl. ................. 324/177; 310/68 B; 318/799; 318/805; 324/161

[58] Field of Search ............................ 324/160, 161, 324/163, 165, 166, 177, 207.15, 207.16, 207.25; 310/68 B; 318/721, 799, 805, 656, 661; 361/239, 240, 242

[56] References Cited

U.S. PATENT DOCUMENTS

| | | |
|---|---|---|
| 4,275,343 | 6/1981 | Fulton et al. . |
| 4,520,300 | 5/1985 | Fradella . |
| 4,705,969 | 11/1987 | Gross . |
| 4,868,497 | 9/1989 | Wallrafen ................... 324/160 |
| 5,321,342 | 6/1994 | Kruse . |
| 5,352,962 | 10/1994 | Galburt . |
| 5,394,102 | 2/1995 | Mori et al. ............. 324/177 X |
| 6,018,225 | 1/2000 | Garces . |

*Primary Examiner*—Gerard Strecker
*Attorney, Agent, or Firm*—James J. McGroary

[57] ABSTRACT

A system and method are provided for measuring rate of rotation. A brushless DC motor is rotated and produces a back electromagnetic force (emf) on each winding thereof. Each winding's back-emf is squared. The squared outputs associated with each winding are combined, with the square root being taken of such combination, to produce a DC output proportional only to the rate of rotation of the motor's shaft.

8 Claims, 2 Drawing Sheets

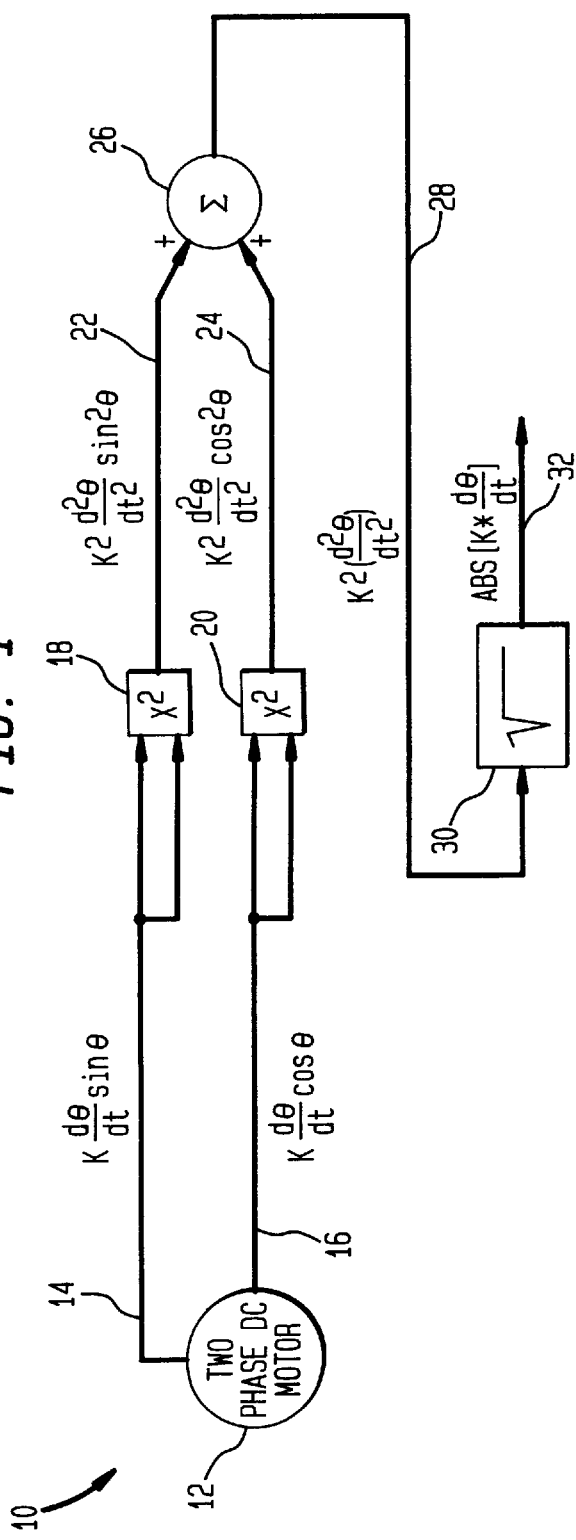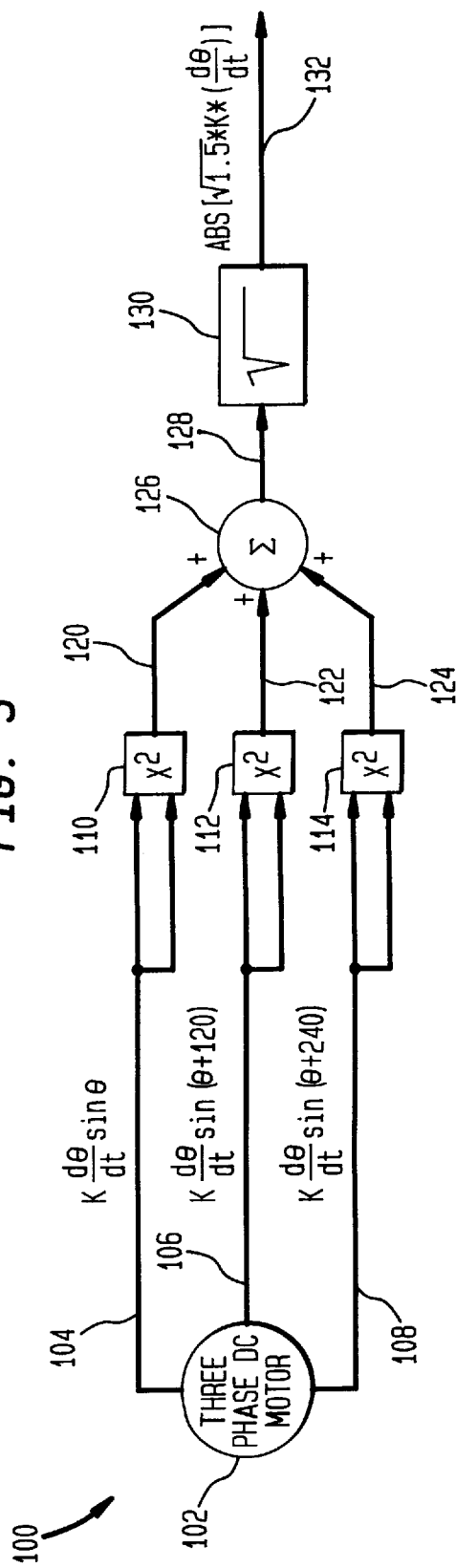

SYSTEM AND METHOD FOR DETERMINING RATE OF ROTATION USING BRUSHLESS DC MOTOR

ORIGIN OF THE INVENTION

The invention was made by employees of the United States Government and may be manufactured and used by or for the Government for governmental purposes without the payment of any royalties.

CROSS-REFERENCE TO RELATED PATENT APPLICATIONS

This patent application is with one related patent application entitled "RATE OF ROTATION MEASUREMENT USING BRUSHLESS DC MOTOR", Ser. No. 09/128,635, filed Jul. 27, 1998, now U.S. Pat. No. 6,084,398, and owned by the same assignee as this patent application.

BACKGROUND OF THE INVENTION

1. Field of the Invention

This invention relates to measuring rate of rotation. More specifically, the invention is an apparatus and method that develops a DC signal indicative of rate of rotation using a brushless DC motor.

2. Description of the Related Art

Angular rate sensing devices or tachometers are well known in the art. Such devices can be constructed using motors with mechanical brushes, using a brushless DC motor combined with position sensors, or using resolver or encoder developed rate sensors. However, each of these devices has drawbacks.

Tachometers built using motors with mechanical brushes present an ongoing maintenance concern in that the mechanical brushes wear out. Further, mechanical brush-type tachometers are prone to electrical arcing which affects device performance.

Tachometers built using a brushless DC motor use position sensors to commutate the back electromagnetic force (emf) signals of the phases of the motor. However, commutation typically takes place using discrete hall sensors to measure position which causes a relatively large ripple in the rate signal. To control the ripple problem, linear position sensors (e.g., resolvers, etc.) can be used for commutation purposes. However, the fact that a position sensor is still required adds weight, complexity and cost to the overall system. Also, use of any position sensor requires some excitation signal which means that wires must be led to the sensor thereby adding weight and cost. Further, the excitation signal must be produced by some apparatus thereby adding more weight and cost.

A resolver developed rate sensor requires some type of differentiation because a resolver is a position sensor, and position must be differentiated to obtain rate. However, as is known in the art, differentiation circuitry is noisy. A further disadvantage is that an excitation signal is required which requires both the leading of wires to the sensor and the need for apparatus to provide such excitation signal.

An encoder developed rate sensor measures time between discrete pulses of an encoder to provide a position change for a given time change, i.e., a rate. Once again, a drawback associated with this type of device is the need for wires to carry excitation signals to the sensor and the associated hardware needed to generate such excitation signal. Further, encoder developed rate sensors are inherently less accurate (especially at slower rates of rotation) because of the discrete nature of the encoder outputs.

SUMMARY OF THE INVENTION

Accordingly, it is an object of the present invention to provide an apparatus and method for measuring rate of rotation.

Another object of the present invention is to provide an apparatus and method for producing a DC signal indicative of rate of rotation.

Still another object of the present invention is to provide an apparatus and method for producing a DC signal indicative of rate of rotation that is reliable and simple to implement.

Yet another object of the present invention is to provide an apparatus and method for producing a DC signal indicative of rate of rotation that does not require the use of position sensors.

Other objects and advantages of the present invention will become more obvious hereinafter in the specification and drawings.

In accordance with the present invention, a system and method are provided for measuring rate of rotation. A brushless DC motor has a shaft driven to rotation and windings disposed about its shaft. When the shaft rotates, a back electromagnetic force (emf) is produced on each winding. The back-emf includes information on rate of rotation. Each of a plurality of squaring circuits is coupled to a corresponding one of the windings for squaring the back-emf associated therewith to produce a squared output. A combining circuit is coupled to the squaring circuits for combining the squared outputs. A square root circuit is coupled to the combining circuit for taking the square root of the combined output to produce a DC output that is proportional only to the absolute value of the rate of rotation of the shaft.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic block diagram of one embodiment for implementing the present invention using a two-phase brushless DC motor;

FIG. 3 is a schematic block diagram of another embodiment for implementing the present invention using a three-phase brushless DC motor.

DESCRIPTION OF THE PREFERRED EMBODIMENT(S)

Figure 2:
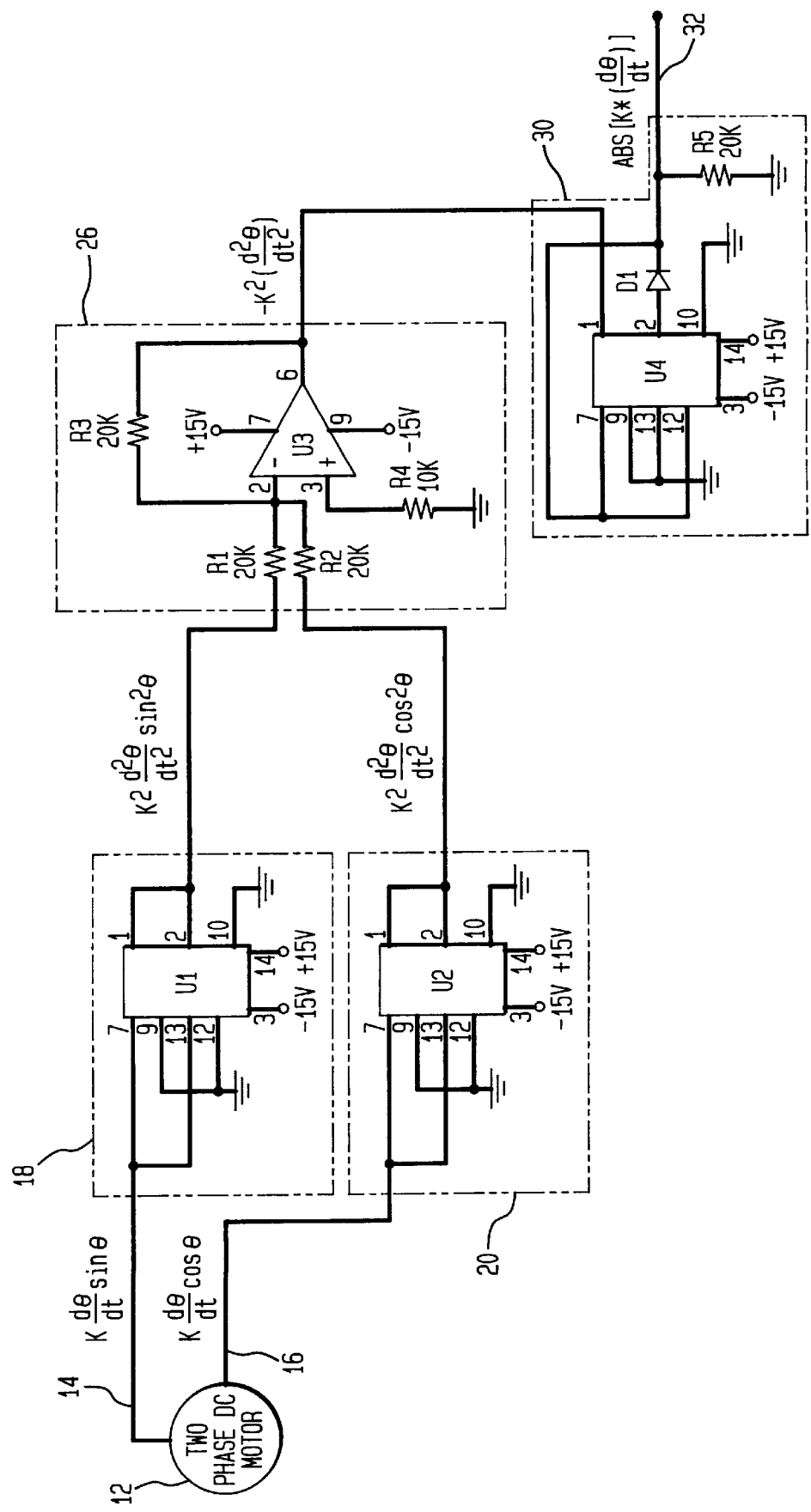
FIG. 2 is a detailed electrical schematic implementation of the present invention using a two-phase brushless DC motor.

Referring now to the drawings, and more particularly to FIG. 1, one system embodiment for implementing the present invention is shown and referenced generally by the numeral 10. System 10 uses a two-phase brushless DC motor 12 having a rotatable shaft (not shown) coupled to some apparatus that will cause the shaft to rotate. It is the rotation of the shaft (of motor 12) that the present invention is designed to measure. It is to be understood that the apparatus and method of the present invention can also make use of a three-phase brushless DC motor as will be described further below.

DC motor 12 is any standard two-phase brushless DC motor having two windings (not shown) disposed about its rotatable shaft. Such motors and their operation are well known in the prior art and will therefore not be described herein. DC motor 12 produces a back electromagnetic force (or "back-emf" as it will be referred to hereinafter) on each of its two windings when the motor's shaft rotates. Phased outputs from each of these windings tapped at 14 and 16 provide the two-phase output of motor 12. As is known in the art, each of outputs 14 and 16 is an AC signal including the back-emf constant of motor 12, the rate of rotation of the shaft of motor 12 and the position of the shaft. More specifically, the output at 14 is of the form $$K(d\theta/dt) \sin \theta \tag{1}$$

where K represents the back-emf constant of motor 12, $(d\theta/dt)$ is the rate of rotation of the motor shaft and $\theta$, in general, is the electrical angle of the motor shaft, i.e., $\theta$ cycles from 0–360° n times per mechanical revolution of the motor shaft where n is one-half the number of poles of motor 12. Note that the electrical angle is equal to the mechanical angle of the motor shaft for two-pole motors. The output at 16 is of the form $$K(d\theta/dt) \cos \theta \tag{2}$$

Outputs 14 and 16 are squared at squaring circuits 18 and 20, respectively. The resulting output signal 22 from squaring circuit 18 is $$K^2(d^2\theta/dt^2) \sin^2\theta \tag{3}$$

and output 24 from squaring circuit 20 is $$K^2(d^2\theta/dt^2) \cos^2\theta \tag{4}$$

Outputs 22 and 24 are insensitive to motor direction in that positive or negative values (indicating the direction of rotation of the motor shaft) are made positive by squaring circuits 18 and 20. Further, note that while there may be a minor gain difference between the apparatus implementing squaring circuit 18 and the apparatus implementing squaring circuit 20, such difference is generally negligible and will therefore be ignored herein.

Squared outputs 22 and 24 are next manipulated in such a way that a DC signal is produced proportional only to rate of rotation. With the form of outputs 22 and 24 given as in equations (3) and (4), the portion of outputs 22 and 24 related to the electrical angle of the motor shaft can be eliminated by adding outputs 22 and 24 at an adder 26 to produce output 28. Specifically, output 28 is $$K^2(d^2\theta/dt^2) \sin^2\theta + K^2(d^2\theta/dt^2) \cos^2\theta = K^2(d^2\theta/dt^2) \tag{5}$$

Note that equation (5) takes advantage of the trigonometric identity $$\sin^2 X + \cos^2 X = 1 \tag{6}$$

in order to make output 28 a DC signal proportional to the square of the rate of rotation of the motor shaft. To obtain a signal proportional to the absolute value of the rate, output 28 is conditioned through a square root circuit 30 resulting in output 32 of the form $$ABS[K*d\theta/dt] \tag{7}$$

where "ABS" indicates absolute value. Thus, output 32 is proportional to the absolute value of the rate of rotation.

By way of illustrative example, FIG. 2 depicts a detailed electrical schematic of the two-phase motor embodiment depicted in FIG. 1. Combinations of circuit elements contained within dashed-line boxes represent a particular functional block with common reference numerals being used where appropriate. In this embodiment, adder 26 is an inverting adder owing to its simplicity of being configured in this fashion. Accordingly, square root circuit 30 (configured using multiplier U4, diode D1 and resistor R6) is an inverting square root circuit. The U1 and U2 multipliers configured as squaring circuits can be implemented using differential input multiplier circuits such as the MPY100 available from Burr Brown Corporation, Tucson, Ariz. The U3 component can be implemented using an operational amplifier such as the OP-07A available from Precision Monolithics Inc., Santa Clara, Calif. The U4 component in square root circuit 30 can also be implemented using a differential input multiplier circuit such as the MPY100 available from Burr Brown Corporation.

As mentioned above, the present invention could also be implemented using a three-phase brushless DC motor. Such a system is shown and referenced generally by numeral 100 in FIG. 3. DC motor 102 is any standard three-phase brushless DC motor having three windings disposed about its rotatable shaft (not shown). Phased outputs from the windings of motor 102 are tapped at outputs 104, 106 and 108, and are of the form $$K(d\theta/dt) \sin \theta \tag{8}$$

$$K(d\theta/dt) \sin (\theta+120) \tag{9}$$

$$K(d\theta/dt) \sin (\theta+240) \tag{10}$$

as is well known in the art. Each of outputs 104, 106 and 108 is squared by respective squaring circuits 110, 112 and 114. Squared outputs 120, 122 and 124 are of the form $$K^2(d^2\theta/dt^2) \sin^2\theta \tag{11}$$

$$K^2(d^2\theta/dt^2) \sin^2(\theta+120) \tag{12}$$

$$K^2(d^2\theta/dt^2) \sin^2(\theta+240) \tag{13}$$

As in the two-phase motor embodiment, squared outputs 120, 122 and 124 are next manipulated to produce a DC signal proportional only to rate of rotation of the motor shaft, i.e., eliminate the portion of the multiplied outputs related to the electrical angle of the motor shaft. With the form of outputs 120, 122 and 124 given as in equations (11), (12) and (13), the portion of outputs 120, 122 and 124 related to the electrical angle of the motor shaft can be eliminated by adding the outputs together at an adder 126 to produce an output 128. Specifically, output 128 is $$K^2(d^2\theta/dt^2) \sin^2\theta + K^2(d^2\theta/dt^2) \sin^2(\theta+120) + K^2(d^2\theta/dt^2) \sin^2(\theta+240) \tag{14}$$

The trigonometric identity $$\sin^2 X + \sin^2 (X+120) + \sin^2 (X+240) = 1.5 \tag{15}$$

is used to simplify equation (14) in order to make output 128 a DC signal proportional to the square of the rate of rotation of the motor shaft. More specifically, by applying equation (15) to equation (14), output 128 is equal to $$1.5*K^2*(d^{2\theta/dt2}) \tag{16}$$

To obtain a signal proportional to the absolute value of the rate, output 128 is conditioned through a square root circuit 130 resulting in output 132 of the form $$ABS[\sqrt{1.5} * K * (d\theta/dt)] \qquad (17)$$

which is proportional to the absolute value of the rate of rotation. The implementation of the block diagram of FIG. 3 can be accomplished in a similar fashion to that depicted in FIG. 2.

The advantages of the present invention are numerous. Rate of rotation is measured in a directionally insensitive fashion without the need to sense shaft position. Thus, the reliability of a brushless DC motor can be exploited without the need to outfit the motor with position sensing equipment. The present invention makes use of simple and quiet off-the-shelf components to provide a DC signal indicative of rate of rotation. Finally, the types of electronics that can be used to implement the present invention do not require tuning as is the case with differentiating and integrating circuits.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for determining rate of rotation, comprising:
    a brushless DC motor having a shaft driven to rotation and having windings disposed about said shaft wherein, when said shaft rotates, a back electromagnetic force (emf) is produced on each of said windings, said back-emf including information on rate of rotation of said shaft;
    a plurality of squaring circuits, each of said plurality of squaring circuits coupled directly to a corresponding one of said windings for squaring said back-emf associated therewith to produce a corresponding plurality of squared outputs;
    a combining circuit coupled to said plurality of squaring circuits for combining said plurality of squared outputs to produce a combined output; and
    a square root circuit coupled to said combining circuit for taking the square root of said combined output to produce a DC output proportional only to said rate of rotation of said shaft.

2. A system as in claim 1 wherein said brushless DC motor is a two-phase brushless DC motor having a first winding and a second winding, said back-emf of said first winding being of the form K(dθ/dt) (sin θ), and said back-emf of said second winding being of the form K(dθ/dt) (cos θ), where K is the back-emf constant of said two-phase brushless DC motor, (dθ/dt) is a signal equal to said rate of rotation of said shaft and θ is the electrical angle of said shaft, and wherein said combining circuit is an adder.

3. A system as in claim 2 wherein said adder is an inverting adder and wherein said square root circuit is an inverting square root circuit.

4. A system as in claim 1 wherein said brushless DC motor is a three-phase brushless DC motor having a first winding, a second winding and a third winding, said back-emf of said first winding being of the form K(dθ/dt) (sin θ), said back-emf of said second winding being of the form K(dθ/dt) (sin(θ+120)) and said back-emf of said third winding being of the form K(dθ/dt) (sin(θ+240)), where K is the back-emf constant of said three-phase brushless DC motor, (dθ/dt) is a signal equal to said rate of rotation of said shaft and θ is the electrical angle of said shaft, and wherein said combining circuit is an adder.

5. A system as in claim 4 wherein said adder is an inverting adder and wherein said square root circuit is an inverting square root circuit.

6. A method of producing a DC output indicative of rate of rotation, comprising the steps of:
    providing a brushless DC motor having a shaft and windings disposed about said shaft;
    rotating said shaft wherein a back electromagnetic force (emf) is produced on each of said windings, said back-emf including information on rate of rotation of said shaft;
    squaring each said back-emf associated with each of said windings to produce a plurality of squared outputs;
    combining said plurality of squared outputs to produce a combined output; and
    obtaining the square root of said combined output to produce a DC output proportional only to said rate of rotation of said shaft.

7. A method according to claim 6 wherein said brushless DC motor is a two-phase brushless DC motor having a first winding and a second winding, said back-emf of said first winding being of the form K(dθ/dt) (sin θ), and said back-emf of said second winding being of the form K(dθ/dt) (cos θ), where K is the back-emf constant of said two-phase brushless DC motor, (dθ/dt) is a signal equal to said rate of rotation of said shaft and θ is the electrical angle of said shaft, and wherein said step of combining comprises the step of adding.

8. A method according to claim 6 wherein said brushless DC motor is a three-phase brushless DC motor having a first winding, a second winding and a third winding, said back-emf of said first winding being of the form K(dθ/dt) (sin θ), said back-emf of said second winding being of the form K(dθ/dt) (sin(θ+120)) and said back-emf of said third winding being of the form K(dθ/dt) (sin(θ+240)), where K is the back-emf constant of said three-phase brushless DC motor, (dθ/dt) is a signal equal to said rate of rotation of said shaft and θ is the electrical angle of said shaft, and wherein said step of combining comprises the step of adding.

* * * * *